(12) United States Patent
Rayfield

(10) Patent No.: US 7,395,628 B2
(45) Date of Patent: Jul. 8, 2008

(54) MULTI-USE FISHING ROD HOLDER WITH ALARM

(76) Inventor: Theodore A. Rayfield, 15423 W. County Rd. B, Hayward, WI (US) 54843

( * ) Notice: Subject to any disclaimer, the term of this patent is extended or adjusted under 35 U.S.C. 154(b) by 266 days.

(21) Appl. No.: 11/181,425

(22) Filed: Jul. 14, 2005

(65) Prior Publication Data

US 2007/0011934 A1  Jan. 18, 2007

(51) Int. Cl.
A01K 97/12 (2006.01)
A01K 97/10 (2006.01)
A01K 97/01 (2006.01)

(52) U.S. Cl. ............................................ 43/17; 43/21.2
(58) Field of Classification Search ...................... 43/17, 43/16, 21.2
See application file for complete search history.

(56) References Cited

U.S. PATENT DOCUMENTS

| | | | | |
|---|---|---|---|---|
| 1,443,981 A * | 2/1923 | Eccleston | ......... | 43/17 |
| 1,737,921 A * | 12/1929 | Derr | ......... | 43/17 |
| 2,032,537 A * | 3/1936 | Kozikowski | ......... | 43/16 |
| 2,170,000 A * | 8/1939 | Eggleston | ......... | 43/17 |
| 2,237,536 A * | 4/1941 | Wells, Jr. | ......... | 43/17 |
| 2,399,435 A * | 4/1946 | Gregory | ......... | 248/538 |
| 2,556,628 A * | 6/1951 | Nisle, Sr. | ......... | 43/17 |
| 2,567,777 A * | 9/1951 | Massino | ......... | 43/17 |
| 2,616,202 A * | 11/1952 | Romberger | ......... | 43/17 |
| 2,624,972 A * | 1/1953 | Burg | ......... | 43/17 |
| 2,649,801 A * | 8/1953 | Freeman | ......... | 43/17 |
| 2,650,052 A * | 8/1953 | Bintz | ......... | 43/21.2 |
| 2,657,494 A * | 11/1953 | Brundage | ......... | 43/17 |
| 2,663,962 A * | 12/1953 | King | ......... | 43/17 |
| 2,679,036 A * | 5/1954 | Ferguson | ......... | 43/17 |
| 2,732,649 A * | 1/1956 | Tuttle | ......... | 43/17 |
| 2,773,326 A * | 12/1956 | Calvert | ......... | 43/16 |
| 2,785,493 A * | 3/1957 | Thiel | ......... | 43/17 |
| 2,795,072 A * | 6/1957 | Porter | ......... | 43/16 |
| 2,803,912 A * | 8/1957 | Kellar | ......... | 43/16 |
| 2,811,802 A * | 11/1957 | Schmidt | ......... | 43/17 |
| 2,973,599 A * | 3/1961 | Olson | ......... | 43/17 |
| 2,977,704 A * | 4/1961 | Tinsley | ......... | 43/17 |
| 3,074,196 A * | 1/1963 | Bronson, Sr. | ......... | 43/17 |
| 3,134,186 A * | 5/1964 | Krueger | ......... | 43/17 |
| 3,147,563 A * | 9/1964 | Molter | ......... | 43/17 |
| 3,156,997 A * | 11/1964 | Smith | ......... | 43/17 |
| 3,190,026 A * | 6/1965 | Roszak | ......... | 43/17 |
| 3,213,561 A * | 10/1965 | Roemer | ......... | 43/17 |
| 3,283,437 A * | 11/1966 | Galarnean | ......... | 43/17 |

(Continued)

FOREIGN PATENT DOCUMENTS

CA    2077694 A1 *  3/1994

(Continued)

Primary Examiner—Darren W Ark
(74) Attorney, Agent, or Firm—Boyle Fredrickson, S.C.

(57) ABSTRACT

A fishing system with audio and visual signals is capable of use with both tip ups and tip downs. The fishing system includes a tower like tubular support extending from a base member configured to receive at least on tip down. The tubular support includes a tubular visual signal housed at a location on the support and an audio signal housed within the support. The tubular support includes a first wiring outlet configured for wiring a switch on the tip downs to the audio and visual signals and a second wiring outlet for wiring a switch on the tip ups to the audio and visual signals.

8 Claims, 11 Drawing Sheets

U.S. PATENT DOCUMENTS

| | | | | |
|---|---|---|---|---|
| 3,285,360 | A * | 11/1966 | Wetsch | 43/17 |
| 3,352,048 | A * | 11/1967 | Fleming | 43/17 |
| 3,359,672 | A * | 12/1967 | Schwartz et al. | 43/17 |
| 3,359,673 | A * | 12/1967 | Roemer | 43/17 |
| 3,371,443 | A * | 3/1968 | Dobson | 43/17 |
| 3,470,647 | A * | 10/1969 | Horner | 43/17 |
| 3,474,561 | A * | 10/1969 | McConkey | 43/16 |
| 3,545,118 | A * | 12/1970 | Stelmach | 43/17 |
| 3,546,805 | A * | 12/1970 | Schaefer | 43/17 |
| 3,603,017 | A * | 9/1971 | Happe | 43/17 |
| 3,645,028 | A * | 2/1972 | Rayburn | 43/17 |
| 3,645,029 | A * | 2/1972 | Roemer | 43/17 |
| 3,698,116 | A * | 10/1972 | Rosier | 43/17 |
| 3,729,849 | A * | 5/1973 | Richard | 43/17 |
| 3,739,514 | A * | 6/1973 | Odney | 43/17 |
| 3,798,630 | A * | 3/1974 | Crosthwait | 43/17 |
| 3,824,730 | A * | 7/1974 | Johnson | 43/17 |
| 3,835,568 | A * | 9/1974 | Whitfield | 43/17 |
| 3,879,880 | A * | 4/1975 | Bailey | 43/17 |
| 3,903,633 | A * | 9/1975 | Hutcherson | 43/17 |
| 4,016,670 | A * | 4/1977 | Pihlaja et al. | 43/17 |
| 4,030,223 | A * | 6/1977 | Loesch et al. | 43/17 |
| 4,030,233 | A * | 6/1977 | Wunsche | 43/121 |
| 4,033,062 | A * | 7/1977 | Denecky | 43/21.2 |
| 4,043,070 | A * | 8/1977 | Lamothe | 43/17 |
| 4,155,188 | A * | 5/1979 | Serrill | 43/17 |
| 4,202,125 | A * | 5/1980 | Kovacs | 43/17 |
| 4,217,720 | A * | 8/1980 | Karr | 43/17 |
| 4,334,377 | A * | 6/1982 | Hartwig | 43/17 |
| 4,373,287 | A * | 2/1983 | Grahl | 43/17 |
| 4,523,403 | A * | 6/1985 | Ivy et al. | 43/17 |
| 4,566,216 | A * | 1/1986 | Randall | 43/17 |
| 4,567,686 | A * | 2/1986 | Akom | 43/17 |
| 4,616,437 | A * | 10/1986 | Harvey | 43/17 |
| 4,620,387 | A * | 11/1986 | Bloom | 43/17 |
| 4,640,038 | A * | 2/1987 | Jershin | 43/17 |
| 4,642,930 | A * | 2/1987 | Graf | 43/17 |
| 4,667,432 | A * | 5/1987 | Torgrimson | 43/17 |
| 4,750,286 | A * | 6/1988 | Gray | 43/15 |
| 4,807,384 | A * | 2/1989 | Roberts, Sr. | 43/17 |
| 4,829,697 | A * | 5/1989 | Nakata | 43/17 |
| 4,837,965 | A * | 6/1989 | True | 43/17 |
| 4,928,419 | A * | 5/1990 | Forrestal | 43/17 |
| 4,934,090 | A * | 6/1990 | Storey et al. | 43/17 |
| 4,942,687 | A * | 7/1990 | Post | 43/17 |
| 4,996,788 | A * | 3/1991 | Wieting et al. | 43/17 |
| 5,050,333 | A * | 9/1991 | Debreczeni | 43/17 |
| 5,067,269 | A * | 11/1991 | Eppley et al. | 43/17 |
| 5,097,618 | A * | 3/1992 | Stoffel | 43/17 |
| 5,157,855 | A * | 10/1992 | Schmidt et al. | 43/17 |
| 5,163,243 | A * | 11/1992 | Wold et al. | 43/17 |
| 5,168,651 | A * | 12/1992 | Wilson | 43/17 |
| 5,187,892 | A * | 2/1993 | Gutierrez | 43/17 |
| 5,199,205 | A * | 4/1993 | Klammer | 43/17 |
| 5,274,944 | A * | 1/1994 | Laessig | 43/17 |
| 5,335,440 | A * | 8/1994 | Williams | 43/21.2 |
| 5,359,802 | A * | 11/1994 | Gutierrez | 43/16 |
| 5,491,923 | A * | 2/1996 | Zingrone | 43/17 |
| 5,551,183 | A * | 9/1996 | Solem | 43/17 |
| 5,570,534 | A * | 11/1996 | Ford | 43/16 |
| 5,829,181 | A * | 11/1998 | Fielder et al. | 43/17 |
| 5,832,652 | A * | 11/1998 | Bartys | 43/17 |
| 5,896,694 | A * | 4/1999 | Midha | 43/17 |
| 5,987,801 | A * | 11/1999 | Anderson | 43/17 |
| 5,992,080 | A * | 11/1999 | Allen | 43/19.2 |
| 6,079,142 | A * | 6/2000 | Danser et al. | 43/17 |
| 6,094,852 | A * | 8/2000 | Roach | 43/17 |
| 6,170,189 | B1 * | 1/2001 | Klein | 43/17 |
| 6,374,532 | B1 * | 4/2002 | Klein | 43/17 |
| 6,446,380 | B1 * | 9/2002 | Radosavljevic et al. | 43/17 |
| 6,463,691 | B1 * | 10/2002 | Atkins | 43/17 |
| 6,622,421 | B1 * | 9/2003 | Daniels | 43/21.2 |
| 6,647,658 | B1 * | 11/2003 | Park | 43/16 |
| 6,789,348 | B1 * | 9/2004 | Kneller et al. | 43/17 |
| 6,898,892 | B2 * | 5/2005 | Senckowski | 43/17 |
| 7,003,912 | B1 * | 2/2006 | Morgan et al. | 43/17 |
| 7,008,086 | B1 * | 3/2006 | Kell | 43/17.5 |
| 7,032,343 | B1 * | 4/2006 | Foss | 43/17 |
| 7,207,133 | B2 * | 4/2007 | Schiemann et al. | 43/17 |
| 7,213,361 | B1 * | 5/2007 | Perigo, Sr. | 43/21.2 |
| 2003/0208947 | A1 * | 11/2003 | Cramer | 43/17 |
| 2006/0130387 | A1 * | 6/2006 | Shumansky | 43/17 |
| 2006/0179706 | A1 * | 8/2006 | Weber et al. | 43/21.2 |

FOREIGN PATENT DOCUMENTS

| | | | |
|---|---|---|---|
| CA | 2175721 A1 | * | 11/1997 |
| CA | 2232803 A1 | * | 11/1999 |
| GB | 2262209 A | * | 6/1993 |
| GB | 2292057 A | * | 2/1996 |
| GB | 2410165 A | * | 7/2005 |
| JP | 5-56736 A | * | 3/1993 |
| JP | 10-313759 A | * | 12/1998 |
| JP | 2001-211801 A | * | 8/2001 |
| JP | 2004-201559 A | * | 7/2004 |

* cited by examiner

MULTI-USE FISHING ROD HOLDER WITH ALARM

BACKGROUND OF THE INVENTION

1. Field of the Invention

The present invention relates in general to the field of fishing. More specifically, the invention relates to a fishing rod support system that can be used with either tip downs or tip ups and having attached audio and visual signaling alarms to indicate a fish bite.

2. Discussion of the Related Art

Fishing remains an extremely popular leisure activity during nearly every season of the year. From the opening day of the spring fishing season through the bleak winter ice fishing season, anglers can usually be found on some body of water throughout virtually any geographic region. Despite its overwhelming popularity, success in fishing often requires extreme levels of patience and vigilance. However, many fishermen do not like to constantly hold their fishing rod and reel assemblies during this waiting process, but instead, would rather secure such assemblies in place while they engage in other activities sometimes remote from the fishing site. Furthermore, holding a pole for a significant amount of time can be tiring for the angler. This is especially true during the ice fishing season. Cold temperatures and high winds can make the process of holding onto a fishing pole a very difficult experience.

In order to avoid constantly holding a fishing pole, anglers fishing from shore may prop their fishing rod(s) up with rocks or sticks or whatever happens to be convenient. Likewise, fishers that fish from the pier typically prop their rods up against the pier railing, between rails or in the railing itself. These makeshift supports allow the angler's hands to be free to attend to other tasks until a fish strike is made.

Numerous ice fishing devices have been developed to assist the fishermen during the winter months. Tip-ups and tip downs are known in the art and provide devices that allow fishermen to place his or her rod in a support structure without the need to constantly monitor the line. Non-limiting examples of such ice fishing structures which have been used are U.S. Pat. No. 4,016,670 issued Apr. 12, 1977, U.S. Pat. No. 4,030,233 issued Jun. 21, 1977, U.S. Pat. No. 4,620,387 issued Nov. 4, 1986, U.S. Pat. No. 4,750,286 issued Jun. 14, 1985, U.S. Pat. No. 5,050,333 issued Sep. 24, 1991, U.S. Pat. No. 5,163,243 issued Nov. 17, 1992, U.S. Pat. No. 5,992,080 issued Nov. 30, 1999, U.S. Pat. No. 6,079,142 issued Jun. 27, 2000, U.S. Pat. No. 6,094,852 issued Aug. 1, 2000 and U.S. Pat. No. 6,622,421 the disclosures of which are hereby expressly incorporated by reference.

A key disadvantage of most fishing rod holders, tip ups and tip downs is that many of these devices still require a fisher to be in close proximity to the device. If the angler does not pay close attention to the rods, a fish can bite and then get off the hook. This is particularly true at night, when it is nearly impossible to watch the rod without a light of sufficient intensity. Such lighting is not only expensive, but also takes away from the natural beauty of the lake. Ice fishing tip ups and tip downs often include flags to signal the bite of a fish. Such flags, however, are usually small in relation to the device and do not provide a signal that can be readily identified. This is especially true when the conditions on a lake are foggy, at night, during snow showers or other conditions which might otherwise limit visibility.

Various audio and visual alarms have been devised in the past to signal a bite on fishing tackle. However, such prior art alarms have all had various shortcomings which have thwarted their widespread acceptance. Among these are switch devices, actuated by movement of the rod, reel or line. Often when the time comes to fight or reel in the fish, many of these devices become a nuisance or hindrance. Additionally, such devices have generally been limited to use with a single rod and reel assembly and designed to provide an effective alerting signal only in close proximity to the rod and reel assembly. Other earlier alarm devices have required auxiliary support structure found only on a boat or pier, or have been difficult to operate, or expensive, or of a size too large for convenient transportation to the fishing site, or prone to causing weakening damage to the fishing line.

Most fish bite signaling devices are typically activated by tension in the fishing line caused by the fish taking the bait. Many such devices in the prior art are lacking in many respects. The below-referenced U.S. patents disclose embodiments that were at least in-part satisfactory for the purposes for which they were intended. The disclosures of all the below-referenced prior United States patents in their entireties are hereby expressly incorporated by reference into the present application for purposes including, but not limited to, indicating the background of the present invention and illustrating the state of the art.

Prior Art devices of this type have relied on a variety of different holders and signaling configurations that are both mechanical and electrical, see for example U.S. Pat. Nos. 3,835,568, 3,371,443 and 3,283,437. In U.S. Pat. Ser. No. 3,835,568, a fishing rod and reel assembly is disclosed that uses a wire bracket to hold the rod and reel with the fishing line engaged around a switch lever interconnected to a power source and both an audio and visual alarm system. When a fish strikes the switch arm is moved activating the audio visual alarms.

In U.S. Pat. No. 3,371,443, a signaling device is shown wherein a rod and reel holder is secured into the ground and a signaling flag assembly is secured thereto. The signaling flag assembly has a pivoted flag arm with a flag held in horizontal position by a latch arm connected to the fishing line. When a fish strikes, the latch arm is pulled up disengaging the flag arm which then falls downwardly to a vertically disposed position adjacent the holder.

U.S. Pat. No. 3,283,437 discloses a rod holder and alarm that utilizes an electric horn activated by an electric contact assembly that moves under impact of the fishing line during a strike closing a circuit activating the electric horn. Morgan U.S. Pat. No. 3,862,508 uses a pole holder pivotally disposed at the upper end of a support, and a coil spring biases the pole holder to normally position it transverse to the support. A strike on the line will overcome the bias of the spring, causing contact to be made with an alarm which, thus, alerts the fisherman.

Smith U.S. Pat. No. 3,156,997, counts on essentially a vertical pole to actuate the alarm and, again, a coil spring is employed. A downward component of the force of the strike would actuate the alarm, which is situated beneath the butt of the handle of the pole. Wetsch U.S. Pat. No. 3,285,360, discloses a coil spring which biases the pole holder toward the vertical. The alarm is at the side of the pole, and a horizontal component of the strike force is needed to bring the handle of the pole into actuating contact. In Schwartz et al. U.S. Pat. No. 3,359,672 there is, again, a coil spring but it is mounted along a bolt, apparently to limit movement, and, in Howard U.S. Pat. No. 3,628,275, the coil spring is mounted in yet another different, relative position.

Rayburn U.S. Pat. No. 3,645,028 uses a screw and spring arrangement to position the pole holder relative to the support, in essentially straight line alignment, although the support is positioned at an acute angle relative to the ground. The Karr U.S. Pat. No. 4,217,720 and Hartwig U.S. Pat. No. 4,334,377 are variations on the same theme. The Hutcherson U.S. Pat. No. 3,903,633 is a variation on the leaf concept, with the alarm on the handle. The alarm is actuated by coming into contact with an essentially stationary surface.

As may be seen from the following analysis, there have been a large number of attempts to provide the angler with the tools to permit him or her to engage in other activities, while being alerted to a strike as one occurs. These efforts differ primarily as to how the objectives may be accomplished, while being relatively uniform as to the means, i.e., all seem to use something to hold the rod or pole and something to alert the fisherman upon there being a strike at the bait or lure. These devices have not addressed several of the other deficiencies in the art. Most of these devices do not provide a visual signal that can be seen from long distances, at night or in inclimate weather. Additionally, many of these devices include complex mechanisms, and require considerable effort to remove the rod from the holder upon the strike of a fish. Many of the devices are not robust enough to meet the demands of the many climates in which people fish, particularly ice fish and do not allow for numerous tip downs to be used at the same time. Furthermore, there is no known device that allows for a tip down support system to be wired to the rod supports on the tip downs as well as the alarm systems, while at the same time providing auxiliary wiring for incorporation of a tip up into the inventive system.

What is therefore needed in light of the above is a fishing pole holder and alarm system that exhibits enhanced robustness, increased visibility and ease of use. There is a further need for a fishing system that allows an alarm system to be wired to both a tip up and a tip down.

SUMMARY AND OBJECTS OF THE INVENTION

In view of the foregoing, it is one object of the present invention to provide a fishing pole holder and alarm system with increased visibility and durability. It is another object of the present invention to provide a fishing pole holder and alarm system that provides for 360 degree viewing of the visual alarm. It is another object of the invention to provide a fishing pole holder that allows for the alarm to be connected to both tip downs and tip ups. Still another object of the invention is to provide a device that has one or more of the characteristics discussed above but which is relatively easy to setup.

Consistent with the foregoing objects, and in accordance with the invention as embodied and broadly described herein, a hands free fishing system, a fishing pole support and strike alarm and a method of fishing using a fishing pole support and strike alarm are disclosed in suitable detail to enable one of ordinary skill in the art to make and use the invention.

In accordance with a first aspect of the invention, the above and other objects are achieved by providing a hands free fishing system that includes a base member, a tubular support extending from the base member and supporting at least one tip down, a visual signal on the tubular support that is in communication with the tip down via a first wiring outlet such that the movement of the tip down will actuate the visual signal. The visual signal preferably comprises a tubular visual signal having similar dimensions to the tubular support and is visible from a 360 viewing area. In another embodiment, the tubular support comprises a second wiring outlet configured for wiring a tip up to the system. The second wiring outlet is also in communication with the visual signal. In one embodiment, the visual signal is comprised of a blinking strobe light or LED.

In still another embodiment, the tubular support comprises a cradle assembly configured to store a fishing rod. Alternatively, the tubular support may define a storage compartment for a fishing pole. In another embodiment, the fishing system includes an audio alarm in communication with the tip down such that the movement of the tip down will actuate the audio alarm. In a still further embodiment, the base includes a base plate that includes at least one aperture configured to receive a fastener for securing the system to a structure. In yet another embodiment, a tip up is wired to the second wiring outlet and the tip up includes audio and visual signals.

In accordance with a second aspect of the invention a fishing pole support and strike alarm includes a tubular tower support configured to support at least one tip down, a visual signal on the tubular support in communication with at least one tip down via a first wiring outlet such that the movement of the tip down will actuate the visual signal and a second wiring outlet configured for wiring a tip up to the tubular support. The visual signal may be a tubular signal aligned with the tower support and viewable from 360 degrees. In one embodiment, the tubular tower support is comprised of fluorescent colors for high visibility. In another embodiment, the tower support comprises a cap that defines a battery compartment. The alarm may include a tilt switch on the tip down wired to the visual signal via the first wiring outlet. In another embodiment, a tilt switch is included on a tip up and wired to the visual signal via the second wiring outlet.

In yet another embodiment, a support plate for mounting the tip down to a surface is included and the tower support defines an internal storage compartment for storing a fishing pole. In an alternative embodiment, the tower support includes an external cradle assembly configured to receive and store a fishing rod.

In another embodiment, a method of fishing using a fishing pole support and strike alarm includes the steps of connecting a tip down to a tubular support that includes a visual signal in communication with the tip down via a first wiring outlet such that the movement of the tip down will actuate the visual signal and a second wiring outlet configured for wiring a tip up to the tubular support, the wiring outlet in communication with the visual signal, securing a fishing rod in the tip down, placing a tilt switch on the tip down and connecting the tilt switch to a visual signal via wiring extending through the first wiring outlet. In an additional embodiment, the method further includes the step of connecting a tip up to the visual signal via the second wiring outlet.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
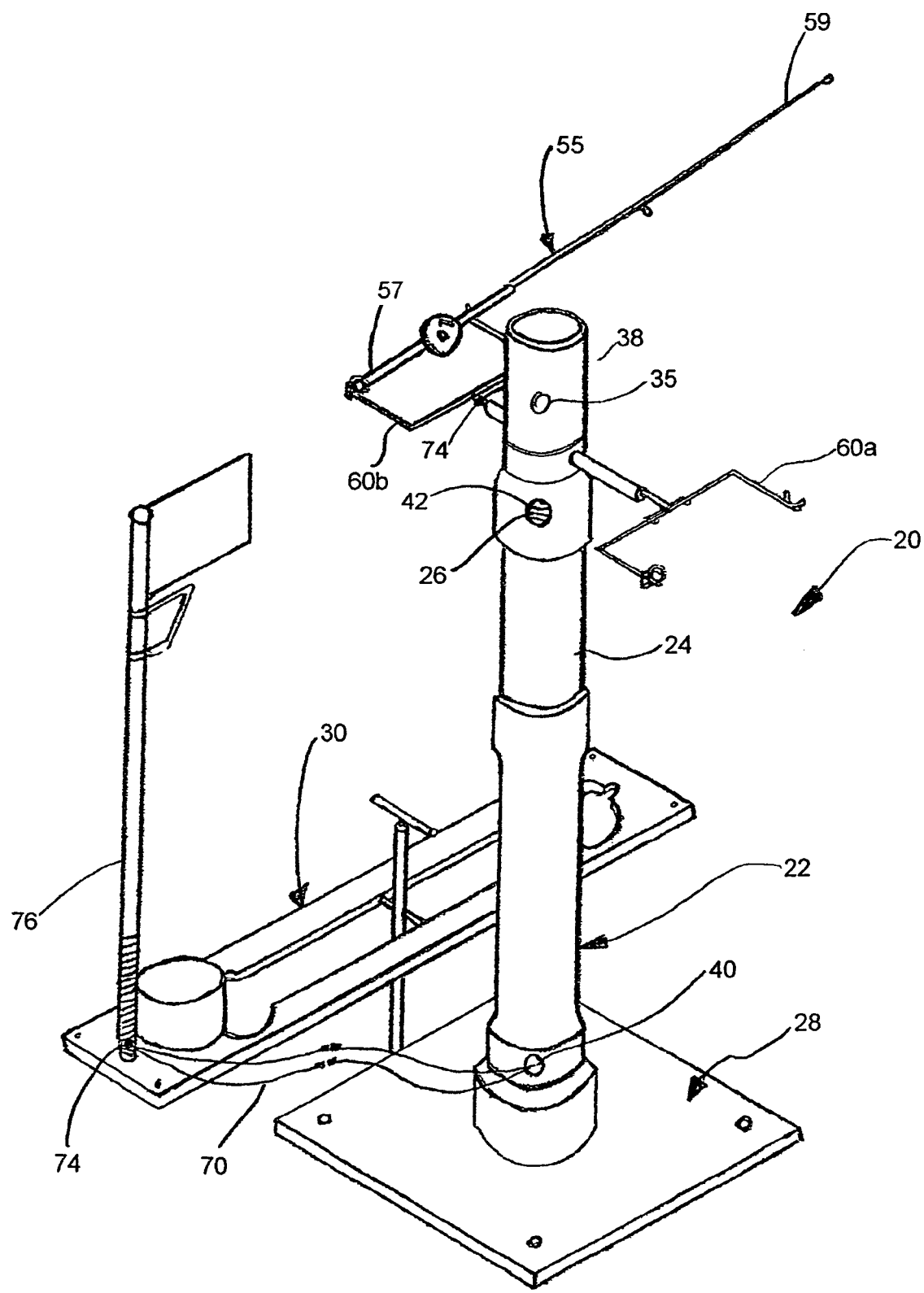
FIG. 1 is a perspective view of the inventive fishing system illustrating the audio and visual signals connected to both a tip up and tip down.

In describing the preferred embodiments of the invention that are illustrated in the drawings, specific terminology will be resorted to for the sake of clarity. However, it is not intended that the invention be limited to the specific terms so selected and it is to be understood that each specific term includes all technical equivalents that operate in a similar manner to accomplish a similar purpose. For example, the word "connected" or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

The present invention relates to a fishing system with audio and visual signals capable of use with both tip ups and tip downs. The fishing system includes a tower like tubular support extending from a base member. The tubular support is configured to receive at least one tip down. The tubular support includes a tubular visual signal housed at a location on the support and an audio signal housed within the support. The tubular support includes a first wiring outlet configured for wiring a switch on the tip downs to the audio and visual signals and a second wiring outlet for wiring a switch on the tip ups to the audio and visual signals.

2. Detailed Description of the Preferred Embodiments

Specific embodiments of the present invention will now be further described by the following, non-limiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Referring now to FIG. 1, a new and improved hands free fishing system in accordance with an embodiment of the invention generally referred to by reference numeral 20, is shown. As it will be described in greater detail below, the fishing system 20, may be used in a variety of situations and locations including, but not limited to: fishing from a pier or shore; fishing from a boat or other vessel; and ice fishing. The fishing system 20 is generally comprised of a tubular support or tower support 22 for supporting a pivotable tip down 60a, 60b. The tubular support 22 includes a visual signal 24, an audio signal 26, and a base member 28. As illustrated in FIG. 1, the fishing system 20 may additionally include a tip up 30. In one embodiment the tip up 30 may include its own audio and visual signals as well as maintaining communication with the visual 24 and audio 26 signals of the tubular support 22.

Figure 7:
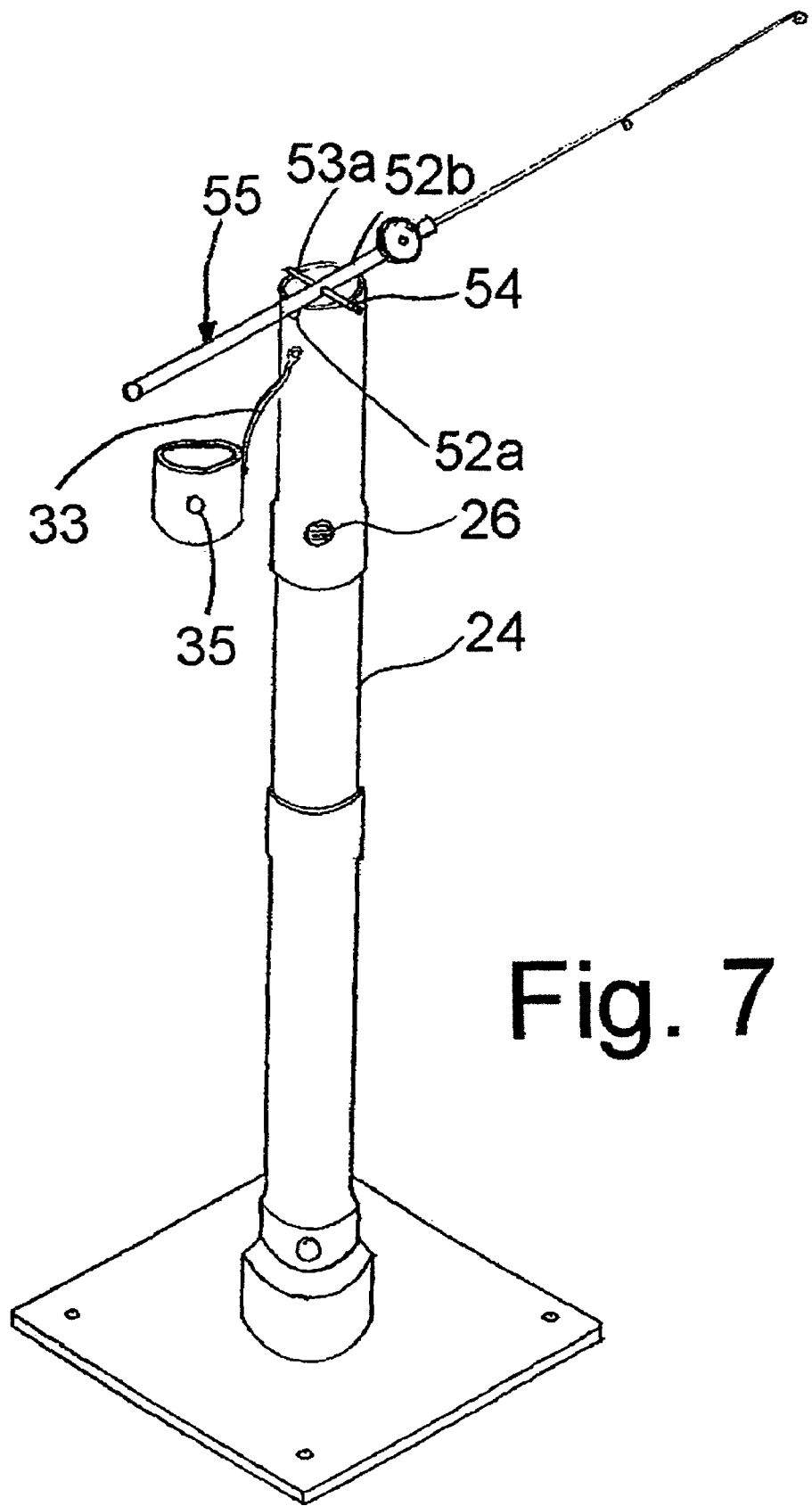
FIG. 7 is a perspective view of an alternative embodiment of the tip down assembly for use with the inventive system.

FIGS. 1-4 illustrate the tubular support 22 of the inventive fishing system 20. As illustrated by the drawings, tubular support 22 is a generally hollow circular member defining a cavity 32 within. As will be described in greater detail below, cavity 32 may provide a storage location for storage of a fishing pole 55. In the illustrated embodiment, the tubular support 22 is comprised of a lower section 34 and an upper section 36 fit around a visual signal 24. An end cap 38, is configured to fit over the upper section 36. Cap 38 may be press-fitted, attached by a threaded connection, snap fitted or maintained using some other attachment mechanism known in the art. In the illustrated embodiment, end cap 38 preferably defines a cavity or compartment 39 configured to retain the battery 41 that provides a source of power for the audio 26 and visual 24 signals of the system 20. End cap 38 may additionally include a low battery indication light 35, to signal when the power supplied to the system is low. Additionally end cap 38 may include a retention strap 33 to keep the end cap 38 attached to the tubular support 22 (FIG. 7).

Although numerous materials can be used in the construction of the tubular support 22, the sections 34, 36 of the tubular support are preferably constructed from 40 schedule PVC. Such material provides increased durability over known systems in the art. The sections 34, 36 of the tubular support 22 are preferably painted with fluorescent colors. Alternatively, a glow-in-the-dark paint or material may be used in constructing the tubular support 22. Such coloring allows for increased visibility during snow cover or in conditions of limited light. As a result, the tubular support 22 can be easily avoided by snowmobiles, ATVs or other vehicles traveling across a frozen lake. It should be understood that the tubular support 22 can take a variety of sizes and the inventive system is intended to be sold in a variety of different sizes to accommodate different uses and different snow depths. In one preferred embodiment, the tubular support is about thirty-two inches tall. In other embodiments the supports range from 16-32 inches however smaller sizes could be manufactured for different applications.

Figure 2:
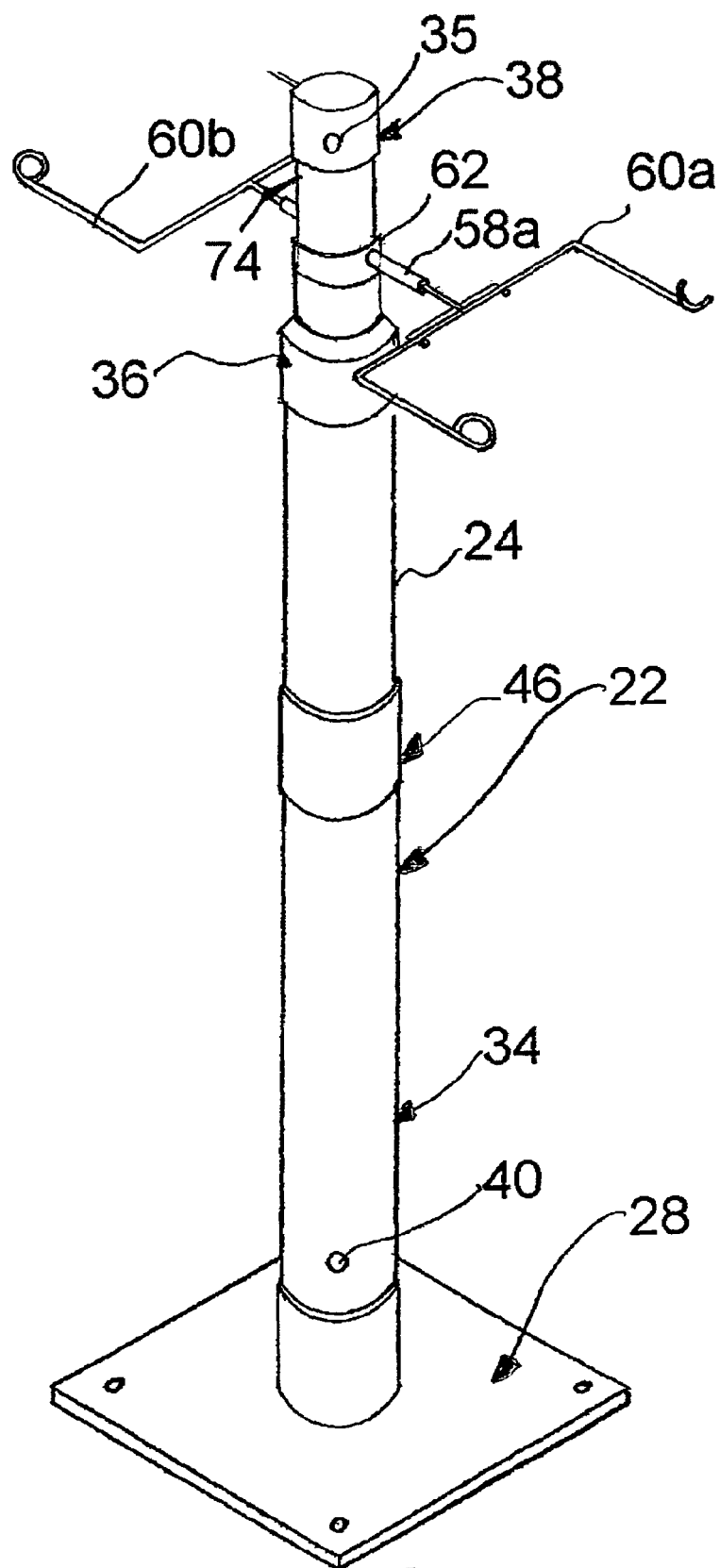
FIG. 2 is a perspective view of the inventive tip down assembly of the fishing system.
Figure 3:
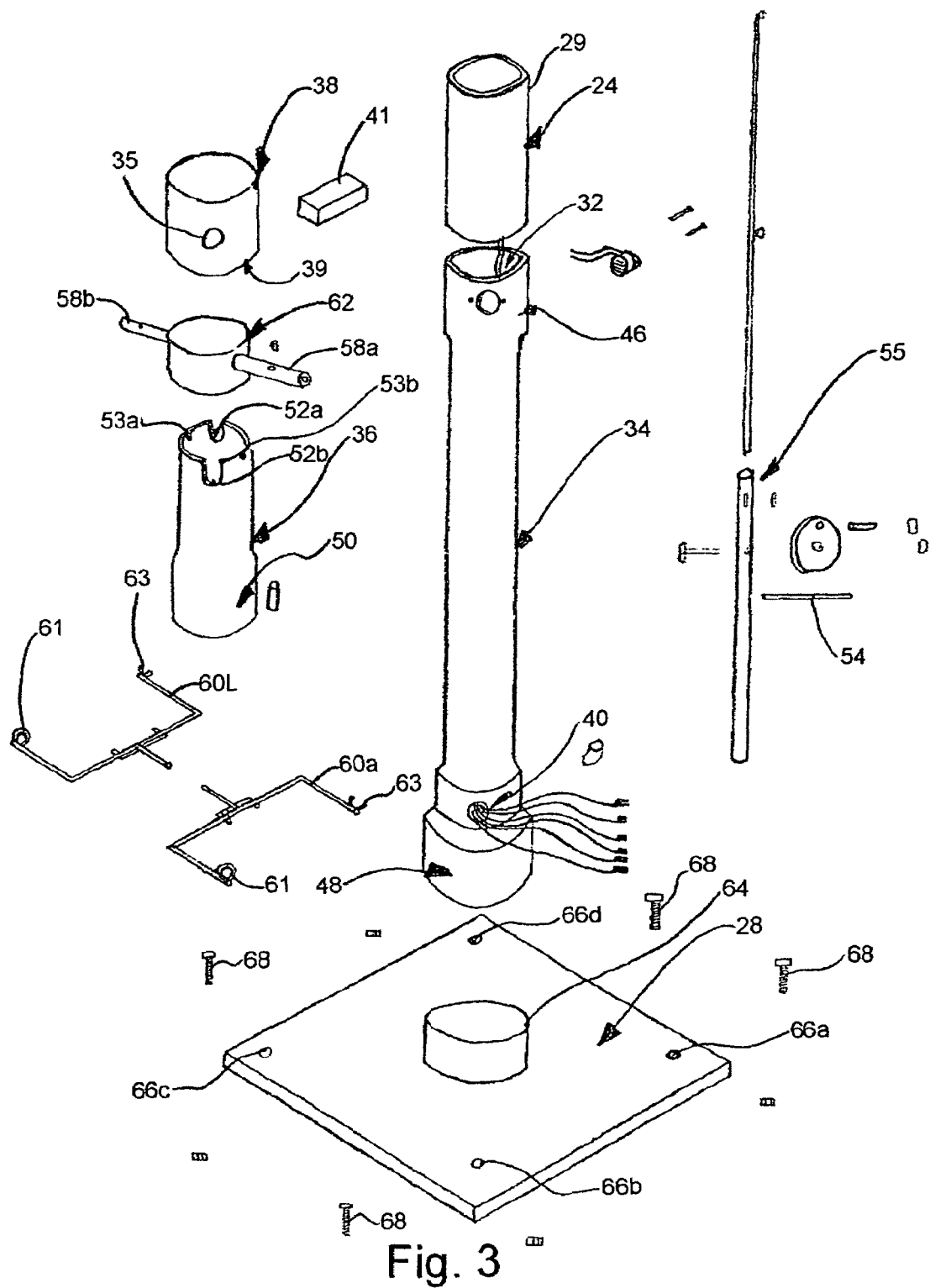
FIG. 3 is an exploded perspective view of the tip down assembly illustrated in FIG. 2.
Figure 4:
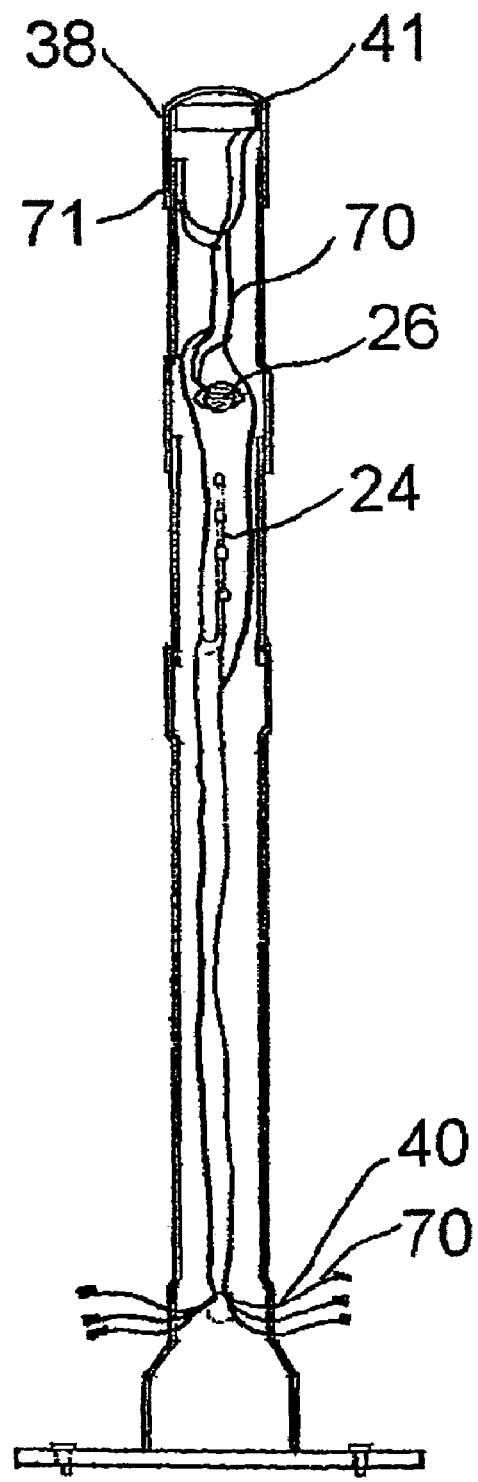
FIG. 4 is a cross sectional view of the tip down assembly illustrated in FIG. 2.

As illustrated in FIGS. 1-3, the lower section 34 of the tubular support 22 includes a lower or second wiring outlet 40. As will be discussed in greater detail below, wiring outlet 40 allows the audio 26 and visual 24 signals of the tubular support 22 to be connected to a separate tip up 30 in addition to the tip downs 60a, 60b thereby providing for a system 20 that allows multiple rods utilizing alternative fishing mechanisms (tip up and tip downs) to be connected to the audio 26 and visual 24 signals of the tubular support 22. As illustrated in FIG. 1, on the lower end of the upper section 36 is a circular audio signal or buzzer cavity 42. Buzzer cavity 42 is configured to receive and retain a high powered audio signal 26. In one preferred embodiment, the audio signal is a high decibel buzzer manufactured by Piezo. It is recognized that a wider variety of other audio signals may be incorporated consistent with the present invention. In one preferred embodiment, the buzzer is a high decibel waterproof buzzer.

As illustrated by the FIGS. 1-4, lower section 34 includes a plurality of widths. At the upper end of the lower section 22 is a wider light receiving rim 46. Light receiving rim 46 may be formed integrally with the lower section 24 or be separately formed and attached for example via a threaded connection. Light receiving rim 46 is configured to receive the tubular visual signal 24 of the preferred embodiment. At the lower end of the lower section 24 is a base receiving rim 48. Base receiving rim 48 is configured to receive and secure the lower section 24 of the tubular support 22 to the base member 28 if desired. The base receiving rim 48 may likewise be integrally formed or separately attached via some connection mechanism such as a threaded connection.

Upper section 36 of the tubular support 22 also includes multiple widths. At the lower end of the upper section 36 is a wider light receiving rim 50. Light receiving rim 50 is configured to fit over and retain the visual signal 24 of the preferred embodiment. At the upper end of the upper section 36 are a two pairs of grooves 52a, 52b and 53a, 53b. Grooves 52a, 52b are configured to receive a fishing rod or pole 55 in an upward tilted arrangement. Grooves 53a, 53b are configured to receive a spring biasing balance pin 54 extending through a fishing pole 55 as illustrated in the arrangement shown in FIG. 7. Additionally, upper section 36 is configured to receive an O-Ring tip down support 62, as illustrated in FIGS. 2 and 3. O-Ring support 62 fits over the upper section 36 and includes a pair of opposed tubular supports 58a, 58b configured to receive and pivotally retain a pair of standard tip down rod supports 60a, 60b as is known in the art. Tip down rod supports 60a, 60b are configured to support a fishing pole in the upright position as illustrated in FIG. 1. Rod supports 60a, 60b are a u-shaped member having a circular handle retaining ring 61 and an opposed rod retaining cradle 63. As is known in the art, upon the strike of a fish, tip down rod supports 60a, 60b rotate downwardly within the tubular supports 58a, 58b of the tip down support 62.

Located between the lower 34 and the upper 36 sections of the tubular support 22 is a visual signal 24. In the preferred embodiment, visual signal is comprised of a clear plastic cylindrical housing 29 configured to fit between the light receiving rims 46, 50 of the lower 34 and upper 36 sections respectively. The cylindrical shape of the visual signal 24 as well as its position on the upper end of the tubular support 22 makes the visual signal 24 both highly visible from long distances and visible from a 360 degree viewing area. Preferably, the visual signal may be viewed from distances up to 500 feet. Located within the housing 29 is some light emitting means. In one embodiment, the light emitting means is a series of blinking LEDs connected to the battery 41. Alternatively, the visual signal 24 may be comprised of a strobe light. The visual signal 24 may be programmed to provide a blinking signal upon the strike of a fish, or a solid continuous signal.

It should be understood that tubular support 22 can be mounted to a variety of structures and surfaces. For example, if the system 20 is being used for ice fishing on a frozen lake with sufficient snowfall, the tubular support can be placed directly into the snow. The same could apply for mounting the tubular support into sandy beaches or dirt coastlines. However, in order to provide a more stable mounting structure the system 20 includes a base member or plate 28 configured to secure the tubular support 22. In the illustrated embodiment, base plate 28 is a rectangular support constructed from PVC or other plastic. A circular mounting projection 64 extends from the center of the base plate 28. Mounting projection 64 preferably has a diameter slightly less than the diameter of the base receiving rim 48 such that rim 48 can receive and secure the lower section 24 of the tubular support 22 to the base plate 28. Lower section 24 may be press-fitted, threadingly attached or attached using other known fasteners to the base plate 28.

Preferably, base plate 28 has a plurality of spaced fastener receiving holes 66a-d. Fastener receiving holes 66a-d are configured to receive a fastener 68 to secure the base plate 28 to some structure or surface. For example, base plate 28 could be secured to the end of a dock, to a fishing boat, to the frozen surface or a lake, or to a shoreline. Thus, base plate 28 allows the system to be firmly secured to some surface, in addition to providing a ready means for detaching the tubular support 22 from the base plate 28 to avoid theft or vandalism of the tubular support 22 when the system 20 is not in use.

Both the audio 26 and visual 24 signals may be wired using means known in the art.

In the embodiment illustrated in FIGS. 1-4, electrically conductive wiring 70 extends from the battery 41, to the audio 26 and visual signals 24 of the system 20. Wiring 70 further extends outwardly from the tubular support from a first outlet 71 located on the end cap 38, as well as from the lower or second wiring outlet 40. In the embodiment illustrated in FIG. 1, wiring 70 extends from the first outlet 71 to tilt switches 74 located on the tip downs 60a, 60b. Wiring 70 further extends from the second wiring outlet 40 to the tilt switch 74 located on the spring mounted flag 76 of the tip up 30.

Tilt switches 74 activate the audio 26 and visual 24 signals of the fishing system 20. Tilt switches are generally known in the art. When the switch 74 is in the on position, it engages the wires 70 leading to the audio 26 and visual 24 signals so that movement of the tip downs 60a, 60b or the flag 76 of the tip up 30 will close the respective switches 74 activating the audio 26 and visual 24 signals. It should be understood that the audio 26 and visual 24 signals may also be wired such that the audio or visual signals may be activated separately or together as desired. Furthermore, the tilt switch 74 may be removed when no signals are desired. Alternatively, switches 74 may send a radio signal to remote sensor that could be carried by the fisherman.

As illustrated in the embodiment shown in FIG. 1, the inventive system 20 allows a variety of known tip up devices to be connected to the audio 26 and visual 24 signals of the system 20. Non-limiting examples of known tip up designs are found for example in U.S. Pat. Nos. 2,785,493, 2,811,802, 2,977,704 and 3,474,561 the entireties of which are incorporated by reference. It is understood that the wired switches 74 could be mounted to virtually any known tip up device to provide a retro fitted alarm system for the tip up. In addition to using known tip up systems, the inventive system further includes a tip up 30 having its own audio 92 and visual 94 signals (FIGS. 5 and 6).

Figure 5:
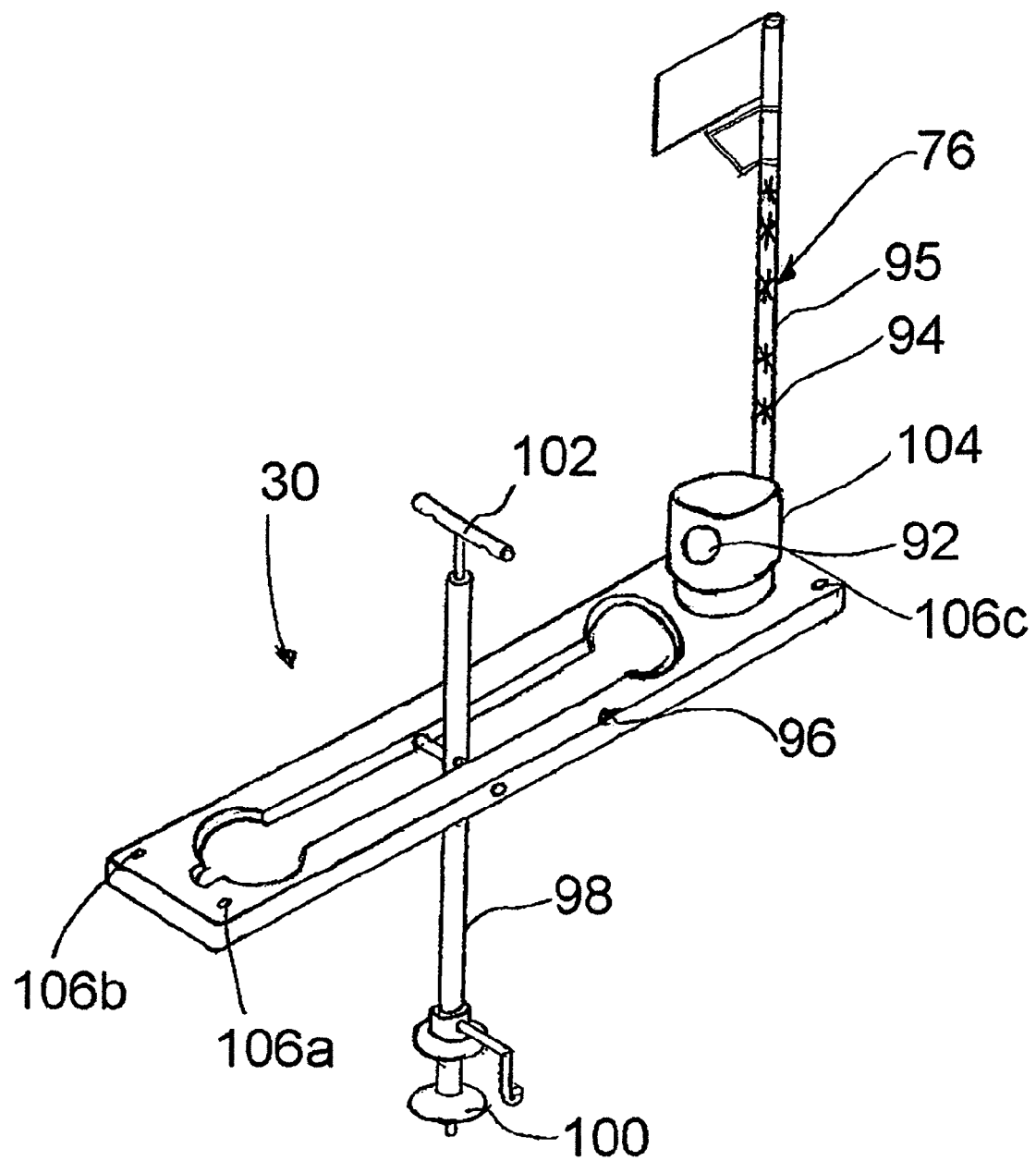
FIG. 5 is a perspective view of one embodiment of a tip up assembly for use with the inventive fishing system illustrated in FIG. 1.
Figure 6:
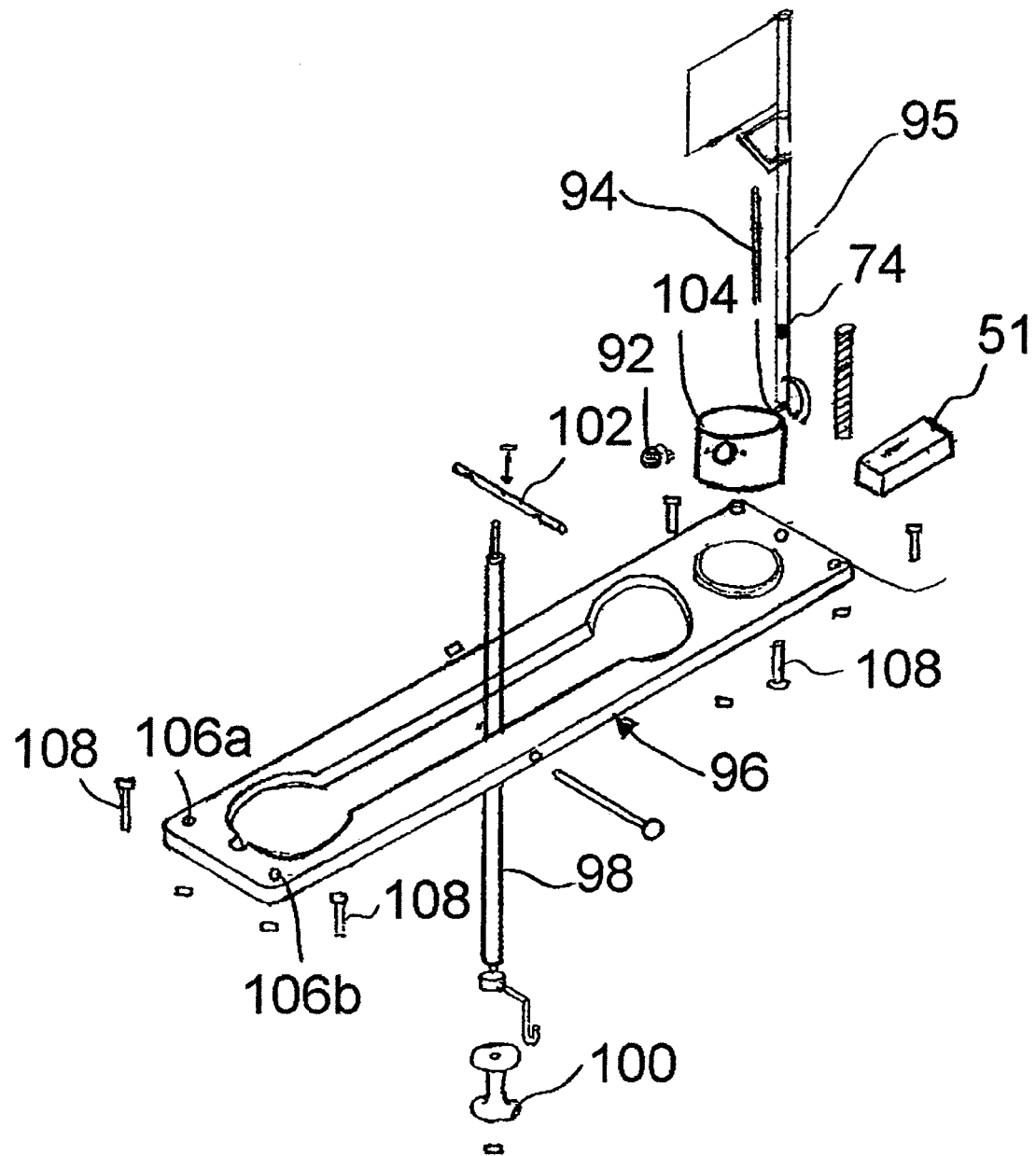
FIG. 6 is an exploded perspective view of the tip up assembly illustrated in FIG. 5.

FIGS. 5 and 6 illustrate one preferred embodiment of the tip up 30 that may be used with the inventive fishing system 20. It should be understood that although the tip up 30 is described in reference to the fishing system 20, tip up 30 may be used separately from the tubular support 22 of the system. As illustrated by FIGS. 5 and 6, the tip up 30 includes several features of known tip up devices including a base 96, spool support 98, spool 100 and trigger 102. Trigger 102 is configured to retain a spring mounted flag 76 prior to the strike of a fish. As with known prior art tip up systems, a strike of a fish moves the spool 100 causing the connected trigger 102 to rotate thereby releasing the flag to signal the strike of a fish. In the illustrated embodiment, tip up 30 further comprises battery cap 104 configured to house a battery 51 as well as the audio signal 92. The battery cap 104 may be attached to the base in a variety of manners as is known in the art. Wiring (not shown) preferably extends form the battery to the audio 92 and visual 94 signals of the tip up 30 as well as a tilt switch in a manner similar to that described previously. In the illustrated embodiment, the visual signal 94 is preferably a plurality of LEDs housed within a clear plastic support 95. The clear plastic support 95 replaces the known flag poles of the prior art. Wiring preferably extends from the audio 92 and visual signals 94 to the battery 51 and further to a tilt switch 74 mounted on or within the support 95. Base 96 preferably includes a plurality of fastener receiving holes 106a-d configured to receive a plurality of fasteners 108 to better secure the tip up 30 to a structure.

FIG. 7 illustrates an alternative configuration for the tip down portion of the inventive system 20. At the upper end of the upper section 36 are two pairs of grooves 52a, 52b and 53a, 53b. Grooves 52a, 52b are configured to receive a fishing pole 55 in an upward tilted arrangement. Grooves 53a, 53b are configured to receive a spring biasing balance pin 54 extending through a fishing pole 55. Balance pin 54 may retain a tilt switch and bias the pole in an upright position in grooves 52a, 52b. Upon the strike of a fish, the pole will be forced downward causing the tilt switch to close and activate the audio 26 and visual 24 alarms.

Figure 10:
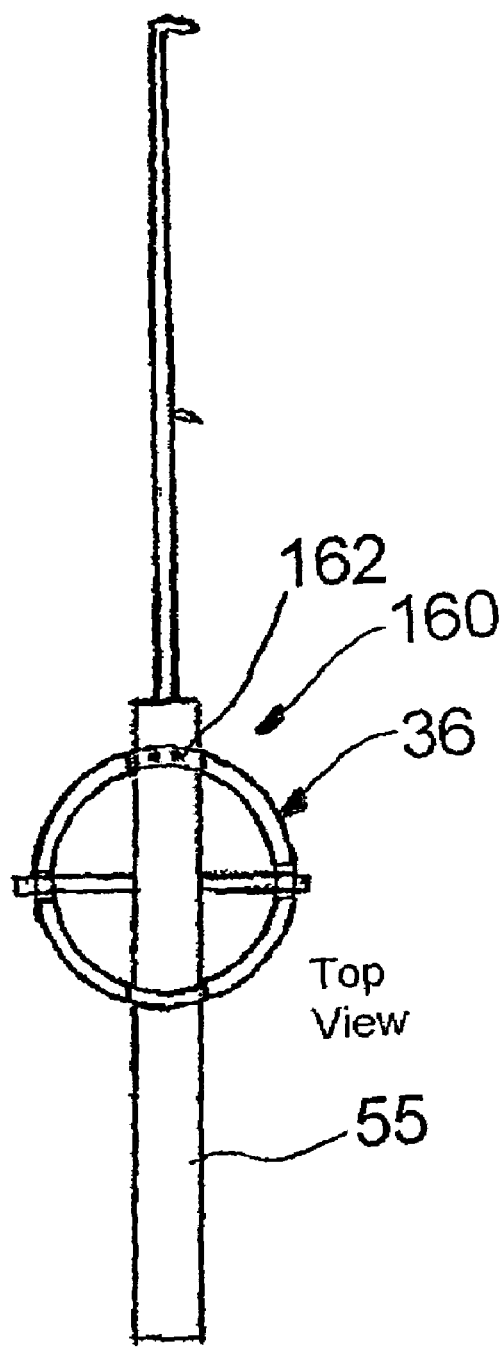
FIG. 10 is a top plan view of an alternative embodiment of a switch device that can be used with the present invention.
Figure 11:
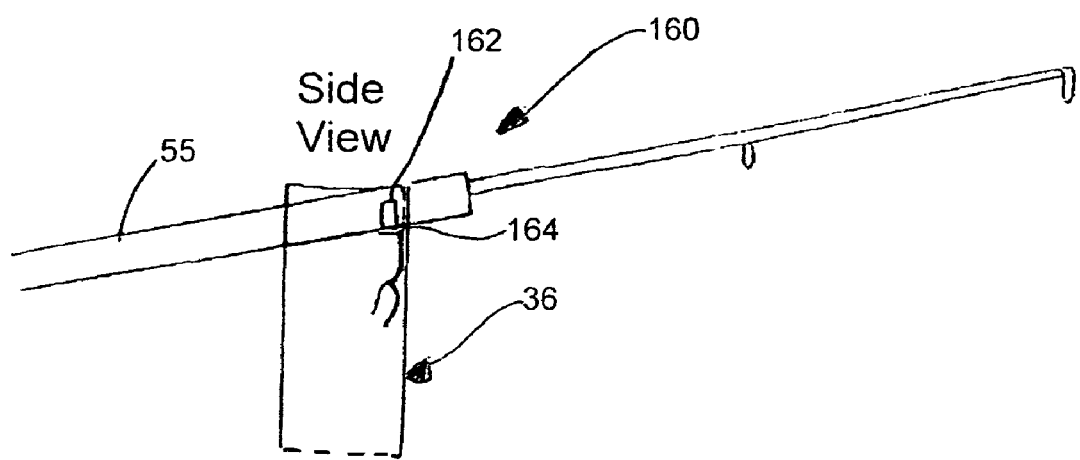
FIG. 11 is a side view of the switch device illustrated in FIG. 10.

It is recognized that a wide variety of alternative switch mechanisms can be utilized with the inventive fishing system 20. FIGS. 10 and 11 illustrate one additional non-limiting alternative embodiment of a switch mechanism that can be used with the present invention. As an alternative to the tilt switch 74 a toggle switch assembly 160 can be utilized. Toggle switches are generally known in the art. In the illustrated embodiment, the toggle switch assembly 160 includes a first piece of metal 162 embedded into the fishing pole 55. Fishing pole is shown pivotally mounted in the grooves 52a, 52b of the tubular support 22. Aligned with the first piece of metal 162 and embedded in the upper section 36 of the tubular support 22 is a second piece of metal 164. The second piece of metal has a negative and positive wire attached to it extending from the battery or power supply as is known in the art. When a fish strikes and the pole 55 tilts down, the first 162 and second 164 pieces of metal come into contact with each other, completing the circuit and causing the audio 26 and visual 24 alarms to activate.

Figure 8:
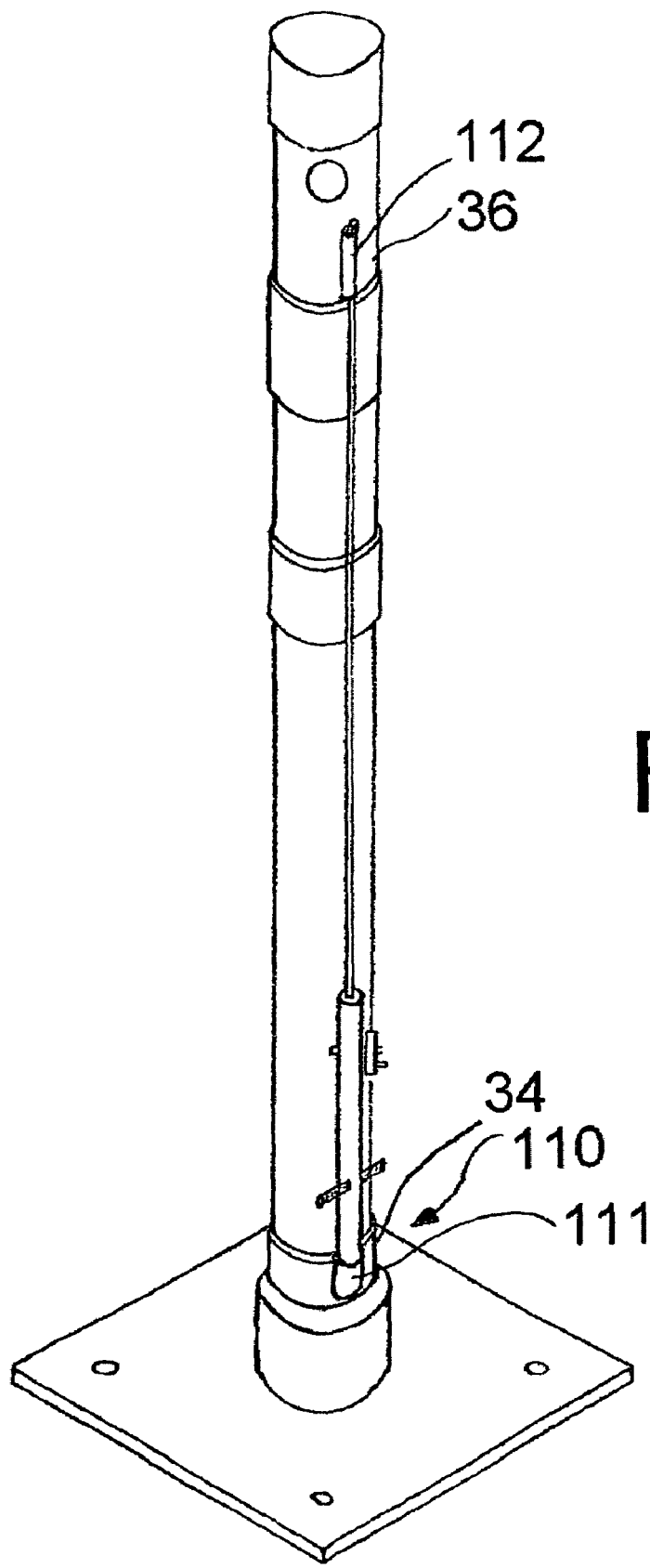
FIG. 8 is a perspective view of an alternative embodiment of the tip down assembly illustrating an external fishing pole storage feature.
Figure 9:
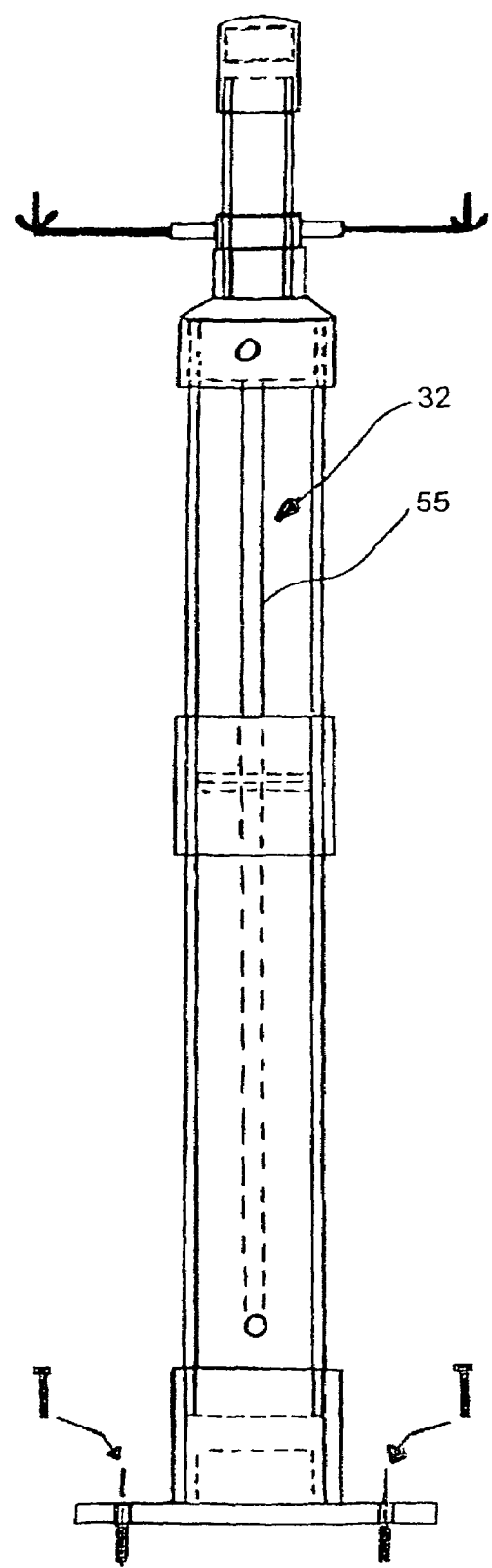
FIG. 9 is a cross-sectional view of yet another alternative embodiment of the tip down assembly illustrating an internal storage cavity.

FIGS. 8 and 9 illustrate alternative fishing pole storage configurations for the inventive fishing system 20. FIG. 8 illustrates an external storage system or cradle assembly 110. The external storage system 110 is comprised of a lower circular support ring 111 attached to the lower section 34 of the tubular support 22. Lower circular support ring 111 is configured to receive and secure the end of a handle 57 of a fishing pole 55. Attached to the upper section 36 of the tubular support 22 is an annular passage 112 configured to receive the distal end 59 of the fishing pole 55. Thus, in order to secure the fishing pole 55 to the system, a user places the distal end 59 of the fishing pole 55 into the annular passage 112 and places the handle 57 of the pole 55 into the lower circular support ring. Alternatively, as illustrated in FIG. 9, the fishing pole 55 may be stored in the inner cavity 32 of the tubular support 22. Removal of end cap 38 allows access to the inner cavity 32 thereby allowing for the ease of removal and storage of the fishing pole 55.

In use, an angler first obtains the tubular support 22 and removes the fishing pole 55 from one of the supports. If the user is using the base plate 28, the tubular support 22 may be secured to the base plate 28 by placing the base receiving rim 48 of the tubular support 22 over the circular mounting projection 64. The O-Ring support 62 is then fit over the upper section 36 of the tubular support. The tip down rod supports 60a, 60b are then placed in the opposed tubular supports 58a, 58b. The fishing pole 55 is placed in the tip down rod supports 60a, 60b. An additional pole may be placed in the grooves 52a, 52b in an upward tilted arrangement with the biasing balance pin 54 extending through a fishing pole 55 and within grooves 53a, 53b. A tilt switch 74 is then placed on the tip down rod supports 60a, 60b or within the balance pin 54 or both. The tilt switches are then connected to the audio 26 and visual 24 signals via wires 70.

If an angler prefers to fish using a tip up 30 in addition to the tip downs or instead of the tip downs, the user may connect the tip up 30 to the audio and visual signals of the tubular support 22. A tilt switch may be placed on the flag 76 of the tip up 30 and connected to wiring 70 extending from the second wiring outlet 40.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

For example, the invention discloses in one embodiment a tubular support 22 comprised of a visual signal 24, upper 36 and lower 34 sections which may be removed from and attached to one another in a variety of manners such as press-fitting or through the use of a threaded connection. However, it should be recognized that the entire tubular support 22 may be integrally formed.

Moreover, as noted throughout the application the individual components need not be formed in the disclosed shapes, or assembled in the disclosed configuration, but could be provided in virtually any shape, and assembled in virtually any configuration, so as to provide for a fishing system that allows for both tip down and tip up fishing while at the same time allowing the tip ups and tip downs to be connected to alarm systems found within the tip down support. Although the support has been described as circular, the support could be any shape that defines an internal passage that can house the alarm systems and provide storage for a fishing pole.

Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A fishing pole support and strike alarm comprising:
   a) at least one tip down;
   b) a tubular support configured to support the at least one tip down, wherein the tubular support is comprised of fluorescent colors for high visibility, wherein the tubular support includes a cap defining a battery compartment;
   c) a visual signal housed by the tubular support, wherein the visual signal comprises a tubular signal aligned with the tubular support and is viewable about an entire circumference thereof, and wherein the visual signal is in communication with the at least one tip down via a first wiring outlet such that the movement of the at least one tip down will actuate the visual signal;

d) a second wiring outlet configured for wiring a tip up to the tubular support, the wiring outlet in communication with the visual signal;

e) at least one tip up;

f) a tilt switch on the at least one tip down which is wired to the visual signal via the first wiring outlet; and g) a tilt switch on the tip up which is wired to the visual signal via the second wiring outlet.

2. The fishing pole support and strike alarm of claim 1 wherein the cap includes a retention strap attached to the tubular support.

3. The fishing pole support and strike alarm of claim 1 wherein the at least one tip up includes a plurality of LED's housed within a clear plastic support.

4. The fishing pole support and strike alarm of claim 1, wherein the tubular support is sized to store a fishing pole in an interior of the support.

5. A fishing system comprising:

a) a base member comprising a base plate that includes at least one aperture configured to receive a fastener for securing the system to a structure;

b) at least two tip downs;

c) a tubular support extending from the base member and supporting the at least two tip downs;

d) a visual signal housed by the tubular support, wherein the visual signal is comprised of a blinking strobe light, wherein the visual signal is in communication with the at least two tip downs via a first wiring outlet such that the movement of one of the at least two tip downs will actuate the visual signal, and wherein the tubular support comprises a second wiring outlet configured for wiring a tip up to the system, the second wiring outlet in communication with the visual signal;

e) wherein the visual signal comprises a tubular visual signal having similar dimensions to the tubular support and is visible about an entire circumference thereof;

f) an audio signal in communication with the at least two tip downs such that the movement of any one of the at least two tip downs will actuate the audio signal; and g) a tip up wired to the second wiring outlet, the tip up comprising audio and visual signals.

6. The fishing system of claim 5 wherein the visual signal is a plurality of LED's housed within a clear plastic support.

7. The fishing system of claim 5, wherein the tubular support is made from 40 schedule PVC.

8. The fishing system of claim 5, wherein the tubular support is sized to store a fishing pole in an interior of the support.

* * * * *